United States Patent
Francart, Jr.

(10) Patent No.: US 10,731,669 B2
(45) Date of Patent: Aug. 4, 2020

(54) TEE-TUBE PRESSURE VESSEL

(71) Applicant: EASTERN MACHINE, INC., Landenberg, PA (US)

(72) Inventor: Armand Francart, Jr., Landenberg, PA (US)

(73) Assignee: EASTERN MACHINE, INC., Landenberg, PA (US)

( * ) Notice: Subject to any disclaimer, the term of this patent is extended or adjusted under 35 U.S.C. 154(b) by 127 days.

(21) Appl. No.: 15/143,836

(22) Filed: May 2, 2016

(65) Prior Publication Data

US 2016/0319994 A1  Nov. 3, 2016

Related U.S. Application Data

(60) Provisional application No. 62/155,259, filed on Apr. 30, 2015.

(51) Int. Cl.
*F04F 1/06* (2006.01)
*F16T 1/48* (2006.01)
(Continued)

(52) U.S. Cl.
CPC .............. *F04F 1/06* (2013.01); *F16K 24/048* (2013.01); *F16L 55/07* (2013.01); *F16T 1/24* (2013.01);
(Continued)

(58) Field of Classification Search
CPC . F04F 1/06; F16L 41/021; F16L 55/07; F16L 55/115; F16L 59/103; F16L 59/106;
(Continued)

(56) References Cited

U.S. PATENT DOCUMENTS

| 3,790,306 A | * | 2/1974 | Uefuji | F16T 1/38 |
| | | | | 417/128 |
| 4,025,236 A | * | 5/1977 | Fujiwara | F16T 1/22 |
| | | | | 137/625.6 |

(Continued)

FOREIGN PATENT DOCUMENTS

| DE | 2309498 A1 | * | 9/1974 | ............. B65D 90/34 |
| GB | 1459484 A | * | 12/1976 | ............. B21C 37/29 |

OTHER PUBLICATIONS

Ansi Tee, from Duhig and Co., Inc. catalog, pp. 1-3, published on or before Oct. 10, 2010, http://www.duhig.com/Images/PDF/ssbuttweldfitt.pdf as accessed by the Internet Archive, see http://web.archive.org/web/20100901000000*/http://www.duhig.com/Images/PDF/ssbuttweldfitt.pdf.
(Continued)

*Primary Examiner* — Hailey K. Do
(74) *Attorney, Agent, or Firm* — Sughrue Mion, PLLC

(57) ABSTRACT

A pressure vessel apparatus according to exemplary aspects includes: a branched tube comprising a tube main body and three branches, wherein a side branch of the branches comprises a flared out portion connected to the tube main body; a liquid inlet opening disposed at a first branch of the branched tube; a liquid outlet opening disposed at a second branch of the branched tube; a gas inlet opening disposed at a third branch of the branched tube, wherein the third branch is the side branch; and a cover plate configured to mount a valve actuating mechanism in the branched tube, the cover plate configured to be joined to the branched tube at the third branch.

18 Claims, 11 Drawing Sheets

(51) Int. Cl.
*F16L 55/07* (2006.01)
*F16T 1/24* (2006.01)
*F16K 24/04* (2006.01)
*F16L 59/16* (2006.01)
*F16L 41/02* (2006.01)

(52) U.S. Cl.
CPC ............... *F16T 1/48* (2013.01); *F16L 41/021* (2013.01); *F16L 59/161* (2013.01); *Y10T 137/2965* (2015.04); *Y10T 137/2968* (2015.04); *Y10T 137/7371* (2015.04)

(58) Field of Classification Search
CPC . F16L 59/11; F16L 59/161; F16T 1/24; F16T 1/22; F16T 1/26; F16T 1/28; F16T 1/30; F16T 1/305; F16T 1/45; F16K 11/0655; F16K 11/065; F16K 11/0787; F16K 11/0785; F16K 21/18; F16K 24/00; F16K 24/04; F16K 24/048; F16K 24/06; F16K 31/265; F16K 31/18; F16K 31/30; F22D 5/08; F22D 5/22; F22D 11/06; F22D 11/02; F22D 11/04; Y10T 137/2965; Y10T 137/7371; Y10T 137/7387; Y10T 137/7475; Y10T 137/2534; Y10T 137/2536; Y10T 137/2514; Y10T 137/2544; Y10T 137/27; Y10T 137/2937; Y10T 137/2947; Y10T 137/2968; Y10T 137/2975; Y10T 137/3102; Y10T 137/3105; Y10T 137/7293; Y10T 137/7319; Y10T 137/7323; Y10T 137/7326; Y10T 137/86043; Y10T 137/86324

See application file for complete search history.

(56) References Cited

U.S. PATENT DOCUMENTS

| | | | | |
|---|---|---|---|---|
| 4,944,251 | A | * | 7/1990 | Fetterly .................... F22D 11/06 122/451 R |
| 5,141,405 | A | | 8/1992 | Francart |
| 5,366,349 | A | * | 11/1994 | Ilg ............................ F04F 1/06 137/399 |
| 5,426,990 | A | | 6/1995 | Francart |
| 5,772,256 | A | * | 6/1998 | Martin ..................... F16L 41/00 285/133.4 |
| 5,941,691 | A | * | 8/1999 | Stephens .................. F04F 1/06 417/131 |
| 6,691,733 | B1 | * | 2/2004 | Morris ..................... F16L 41/16 137/317 |
| 8,858,190 | B2 | * | 10/2014 | Collins ................. F04B 49/025 417/132 |
| 8,882,473 | B2 | * | 11/2014 | Gandhi ..................... F04F 1/06 417/126 |
| 2014/0209175 | A1 | * | 7/2014 | Cardia .................... F16K 1/427 137/2 |
| 2015/0240982 | A1 | * | 8/2015 | Eisner .................. F16L 41/021 166/305.1 |
| 2015/0345516 | A1 | * | 12/2015 | Fisher ........................ F04F 5/48 417/54 |

OTHER PUBLICATIONS

Ansi Tee, pp. 1.

* cited by examiner

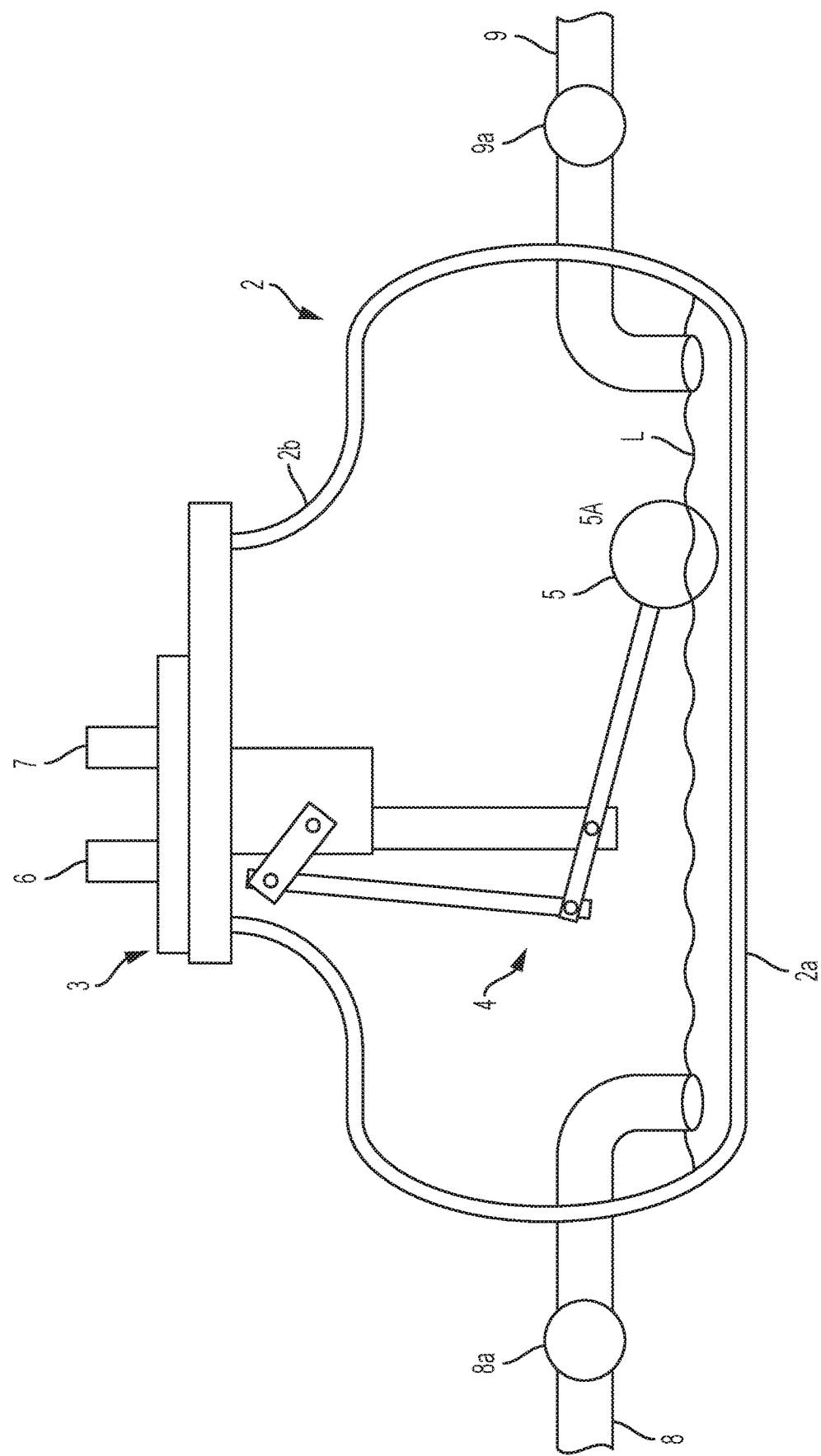

TEE-TUBE PRESSURE VESSEL

CROSS REFERENCE TO RELATED APPLICATIONS

The present application claims priority to U.S. Provisional Application No. 62/155,259, filed on Apr. 30, 2015, the contents of which is incorporated herein by reference in its entirety.

BACKGROUND

Technical Field

Exemplary embodiments of the present disclosure relate to a pressure vessel apparatus comprising a branched tube with a flared out portion and an actuating mechanism in the branched tube.

Description of the Related Art

In a related art, a pressure vessel may be employed for storing a liquid which gradually accumulates and then is discharged from the pressure vessel after reaching a certain level. Such a pressure vessel may be useful in a liquid pumping system where the discharge of the accumulated liquid is triggered by a float and the liquid is driven from the pressure vessel by the introduction of a pressurized fluid. A toggle linkage float-operated actuating mechanism may be used to open and close respective pressure and vent valves for allowing the introduction and venting of the pressurized fluid.

As one example of an applicable toggle linkage float-operated valve actuating mechanism, see U.S. Pat. No. 5,426,990 to Francart, issued Jun. 27, 1995, which is hereby incorporated by reference in its entirety.

A conventional toggle linkage over-center float-operated valve actuating mechanism is useful in controlling the filling of a closed or sealed pressure vessel and for driving an accumulated liquid periodically from the vessel. Typically, a vent valve vents the interior of the vessel to the atmosphere and a second pressure valve subjected to high pressure inlet fluid admits live steam or any compressible gas (e.g., nitrogen, air, etc.) to drive an accumulated liquid from the vessel. In filling the vessel, the vent valve is in the open position, and the pressure valve is closed by a single float-operated over-center toggle linkage valve actuating mechanism. As the vessel fills with liquid, the float rises and a pivotable float arm forming part of the valve actuating mechanism is swung or pivoted about a pivot point at an end remote from the float. The end remote from the float is mechanically coupled to an over-center toggle linkage mechanism to move the mechanism towards a center, link in line position against a spring bias. Such mechanisms have toggle links which snap quickly through the center line position, acting to close the vent valve simultaneously with snap opening of the high pressure inlet valve to pump the accumulated liquid from the vessel, and vice versa. Typically, a tension coil spring provides such biasing force, with the tension coil spring coupled at opposite ends to movable elements of the valve actuating mechanism; normally the opposite ends of two toggle links, which themselves are pivoted to each other remote from the spring coupling points.

However, a typical pressure vessel which houses a toggle linkage over-center float-operated valve actuating mechanism such as that described above is generally formed in a particular shape to accommodate the actuating mechanism. Furthermore, such typical pressure vessels are substantially cylindrical bodies with a major axis oriented vertically to allow sufficient range of motion for the float linkage to swing through in the interior of the chamber. As an example of a pressure vessel which houses a float-operated actuating mechanism, see U.S. Pat. No. 5,141,405 to Francart, issued Aug. 25, 1992, which is also hereby incorporated by reference in its entirety.

A conventional pressure vessel may have a body and a lid specially formed to accommodate the actuating mechanism. However, manufacturing a specialized pressure vessel may be expensive since it requires specialized tooling and forming of particular parts. Furthermore, a cylindrical pressure vessel that is oriented vertically encounters difficulties in packaging in some applications. For example, it may be desirable to position a pressure vessel under other equipment, but an apparatus with a tall profile is more difficult to fit in such spaces. Additionally, a liquid pumping system may function to collect condensate from other components in the system, thus the liquid is accumulated in the pressure vessel by gravity. In this instance, it is desirable to position the pressure vessel as low as possible, but a vertically oriented pressure vessel is not optimal for such an arrangement.

SUMMARY

Exemplary embodiments of the present application may provide a pressure vessel apparatus which advantageously addresses some of the problems of conventional pressure vessels for liquid pumping systems described above. Although the present invention is not required to overcome all of the disadvantages described above, the exemplary implementations of the present disclosure may address the above disadvantages, and further disadvantages not described above, or may not overcome any of the problems listed above while still providing enhancement to the related art.

In particular, exemplary embodiments may provide a pressure vessel apparatus formed with a flared out shape at a top portion of a main body of the pressure vessel wherein the flared out top portion forms a smooth radiused connection with the main body. Additionally, the pressure vessel apparatus may comprise a branched tube with the flared out portion and an actuating mechanism disposed in the branched tube.

According to exemplary embodiments, a float linkage enclosed within the pressure vessel may be permitted to swing through a wide range of motion, thus allowing the pressure vessel to function with a large amount of liquid. Furthermore, the main body of the pressure vessel may be oriented horizontally, which is advantageous for positioning the pressure vessel low to the ground.

BRIEF DESCRIPTION OF THE DRAWINGS

The above and other aspects of the present invention will become more apparent from the following description of exemplary embodiments, taken in conjunction with the accompanying drawings of which:

FIG. 2A is a cutaway view showing the interior of a pressure vessel according to an embodiment of the present disclosure when a float is at a first position.

DETAILED DESCRIPTION OF EXEMPLARY EMBODIMENTS

Figure 1:
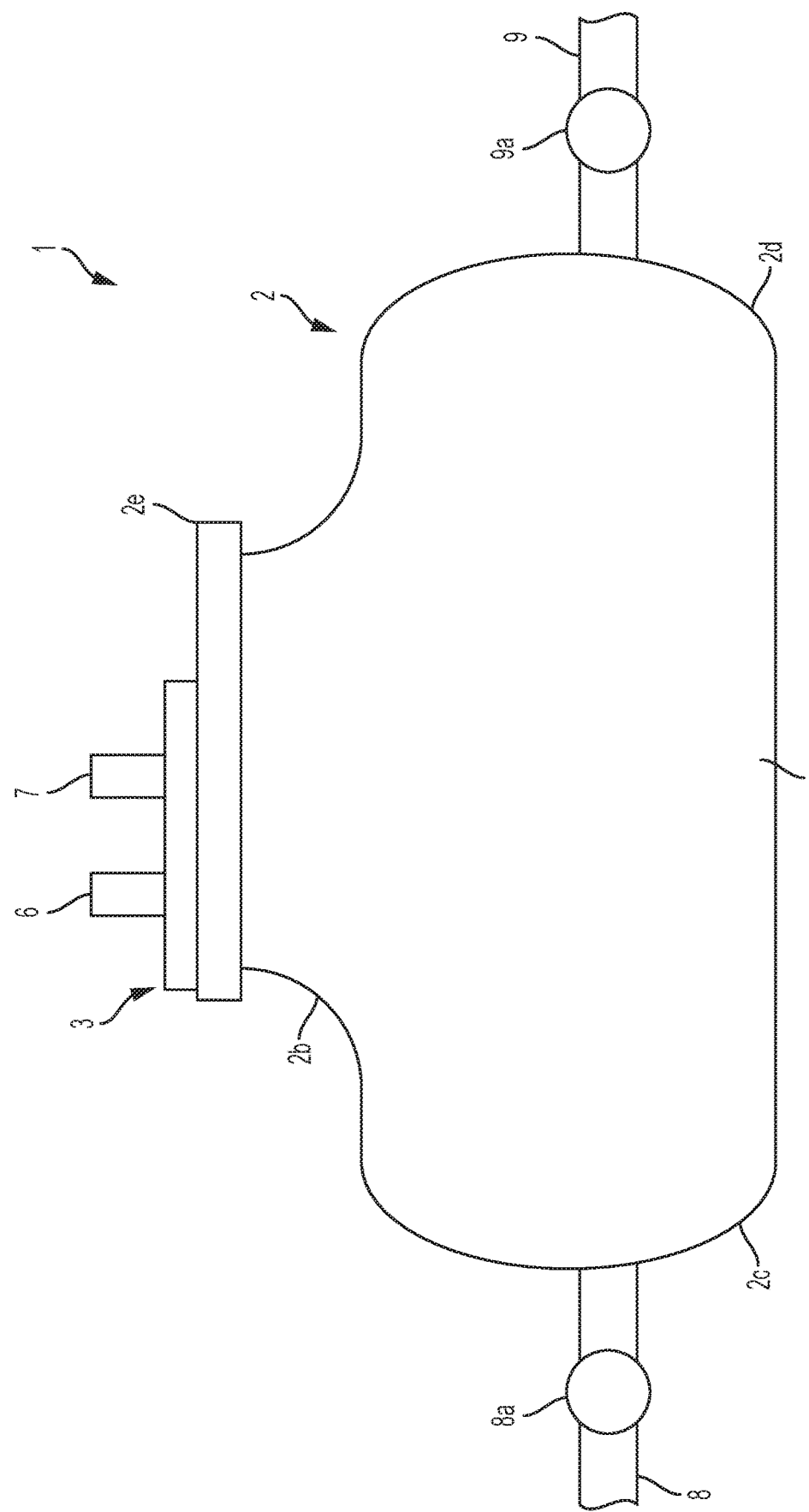
FIG. 1 is an isometric view of a pressure vessel according to an embodiment of the present disclosure.

Hereinafter, exemplary embodiments will be described in greater detail with reference to the accompanying drawings.

In the following description, same reference numerals are used for the same elements when they are depicted in different drawings. Elements are described in detail in order to assist in an understanding of exemplary embodiments. Thus, it is apparent that exemplary embodiments may be carried out without those specifically-defined elements. Detailed descriptions of known elements are omitted for clarity and conciseness.

As shown in FIG. 1, in one exemplary embodiment, a gas pressure powered liquid pump 1 is formed principally by a pressure vessel 2 having a main body 2a, a flared out portion 2b, an endcap 2c, an endcap 2d, and a cover 2e. The pressure vessel 2 houses an actuating mechanism indicated generally at 3. The actuating mechanism 3 comprises, on the exterior, a gas inlet valve 6 and a vent valve 7. Mounted to opposite sides of the pressure vessel 2 at its bottom are a liquid inlet 8 and liquid outlet 9. The liquid inlet 8 includes a normally open inlet check valve 8a preventing liquid, which accumulates within the pressure vessel 2, from exiting through the liquid inlet 8 upon gas pressurization of the pressure vessel 2. The check valve 8a also prevents liquid from exiting through the liquid inlet 8 when the level of the liquid accumulating in the pressure vessel 2 is above the level of the liquid inlet 8. The liquid outlet 9 includes a normally closed liquid outlet check valve 9a which opens at a given high gas pressure to allow periodic gas pressure pumping or discharge of accumulated liquid L from within the chamber formed within the pressure vessel 2. A check valve such as the inlet check valve 8a and outlet check valve 9a is a valve disposed to prevent backflow of fluid in one direction. For example, check valves may prevent backflow from downstream lines back into the pressure vessel 2, or from the pressure vessel 2 to upstream lines on the inlet side. It should be noted that the inlet and outlet direction could be reversed.

Figure 2B:
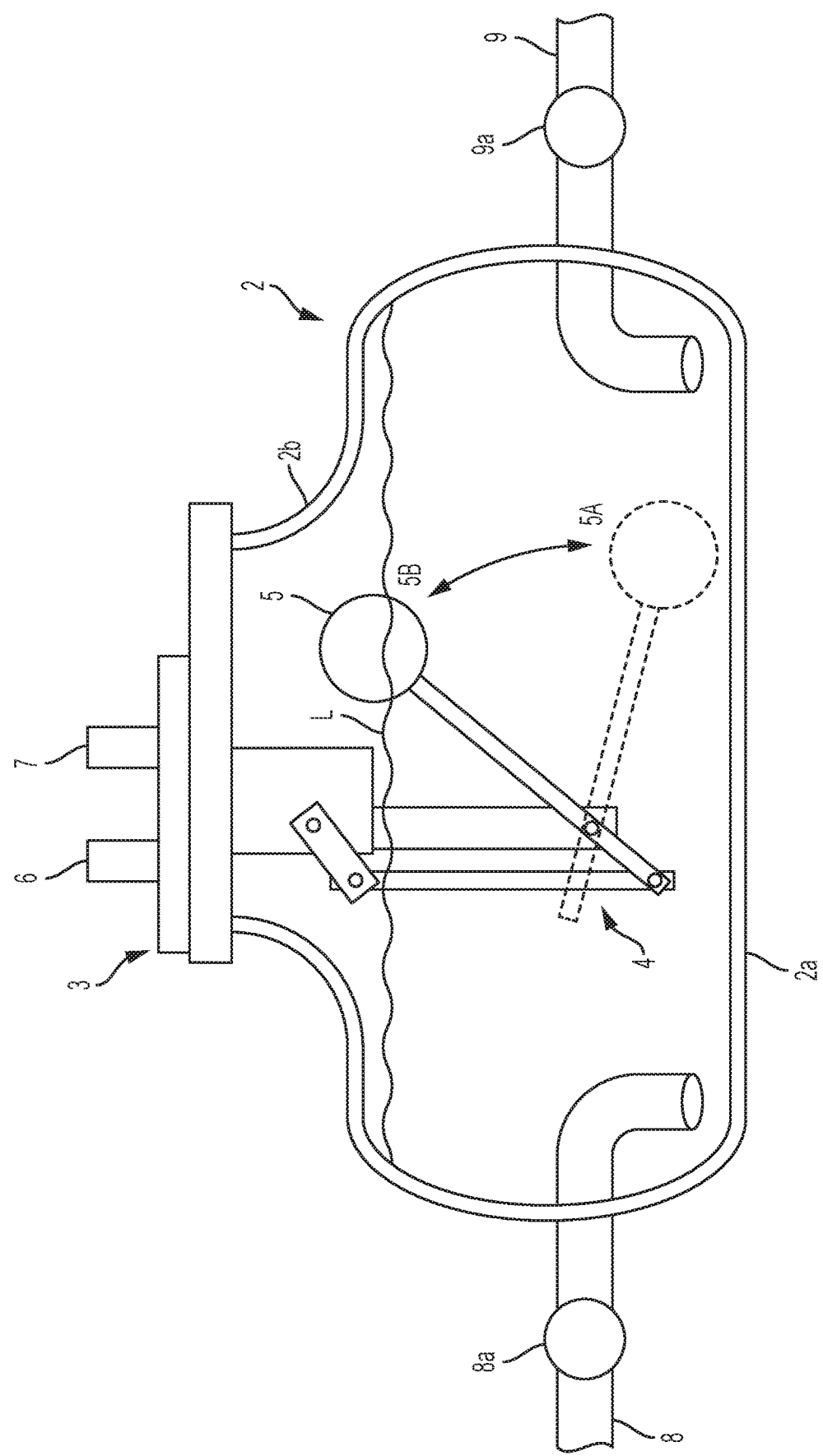
FIG. 2B is a cutaway view showing the interior of a pressure vessel according to an embodiment of the present disclosure when a float is at a second position.

FIGS. 2A and 2B are cutaway views showing the interior of pressure vessel 2. The actuating mechanism 3 housed in the pressure vessel 2 comprises an over-center toggle link mechanism 4 which operates an operating valve assembly including the gas inlet valve 6 and vent valve 7. The over-center toggle link mechanism 4 is actuated by a float 5 to change the state of the normally closed gas inlet valve 6, which admits steam (or other high pressure gas), and the normally open vent valve 7.

Figure 7:
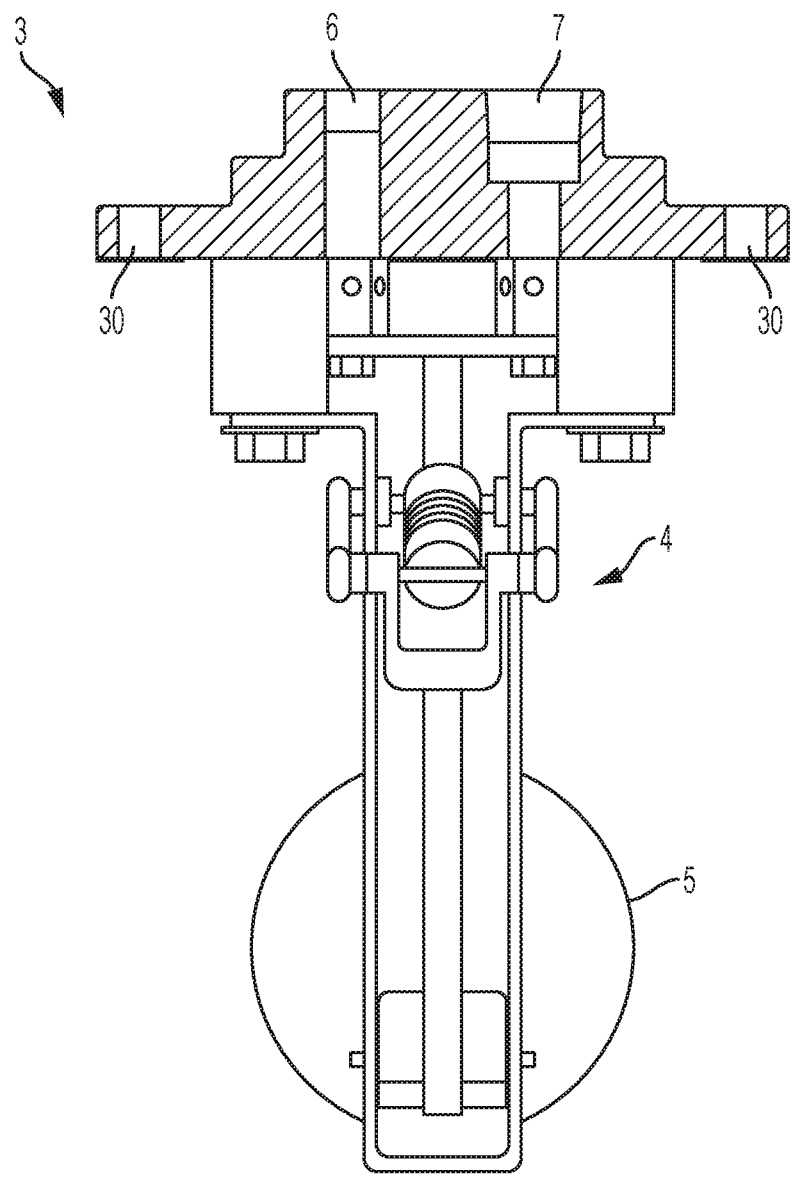
FIG. 7 is a rear view of an actuating mechanism according to an embodiment of the present disclosure.
Figure 8:
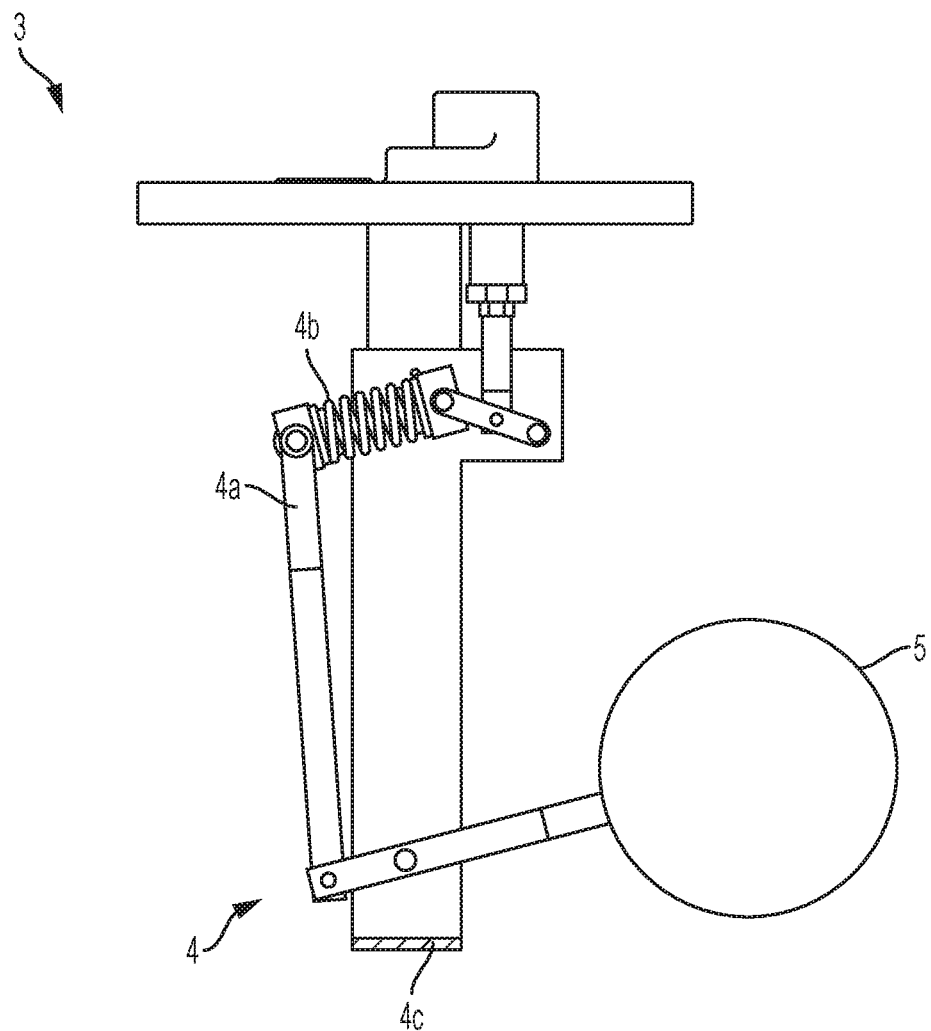
FIG. 8 is a side view of an actuating mechanism according to an embodiment of the present disclosure.

FIG. 7 and FIG. 8 show a rear and side view of an exemplary actuating mechanism 3, respectively.

In the normal position before the initiation of pumping, the float 5 is at its lowest position, indicated as 5A in FIG. 2A, with gas (e.g., steam) inlet valve 6 closed and the vent valve 7 open. When liquid flows by gravity through the inlet check valve 8a into the pressure vessel 2, the float 5 will rise due to buoyancy. When the float 5 has risen to its upper tripping position, indicated as 5B in FIG. 2B, actuating mechanism 3 activates and causes the pressurized gas (e.g., steam) inlet valve 6 to open and simultaneously causes the vent valve 7 to close.

As the liquid level L in the pressure vessel 2 decreases during the discharge cycle, the float 5 drops. Before the float 5 reaches its lowest position, the actuating mechanism 3 activates again and causes the vent valve 7 to open and simultaneously causes the gas inlet valve 6 to close, thus ending the discharge cycle.

As shown in FIGS. 2A and 2B, the shape of the flared out portion 2b of the pressure vessel 2 allows the float 5 to swing through a large pie-shaped region between positions 5A and 5B within the interior of the pressure vessel 2. Because the float 5 is attached to the over-center toggle link mechanism 4 and pivots about an axis, the float 5 sweeps out a circular arc path. Therefore, a pie-shaped region of empty space is provided to accommodate the swinging portion of the float 5 within the pressure vessel 2. It should be noted that the float 5 is connected to a float arm, and a longer float arm means a larger moment will be generated about the float arm's pivot axis, and thus a larger force will be generated which acts on the over-center toggle link mechanism 4. A longer float arm therefore increases the sensitivity of the liquid pump 1. Moreover, a larger range of motion for the float arm allows the pressure vessel 2 to be compatible with a large volume of liquid L.

It is also noted that over-center toggle link mechanism 4 may include components which protrude laterally, for example to the left side in FIGS. 2A and 2B, within the pressure vessel 2. For example, as shown in FIG. 8, a linkage arm 4a and a spring 4b protrude laterally away from a base 4c. Therefore, the flared out portion 2b additionally accommodates the moving components of the linkage which similarly require space in the interior of pressure vessel 2 on the opposite side of the actuating mechanism 3 from the float 5.

Figure 3:
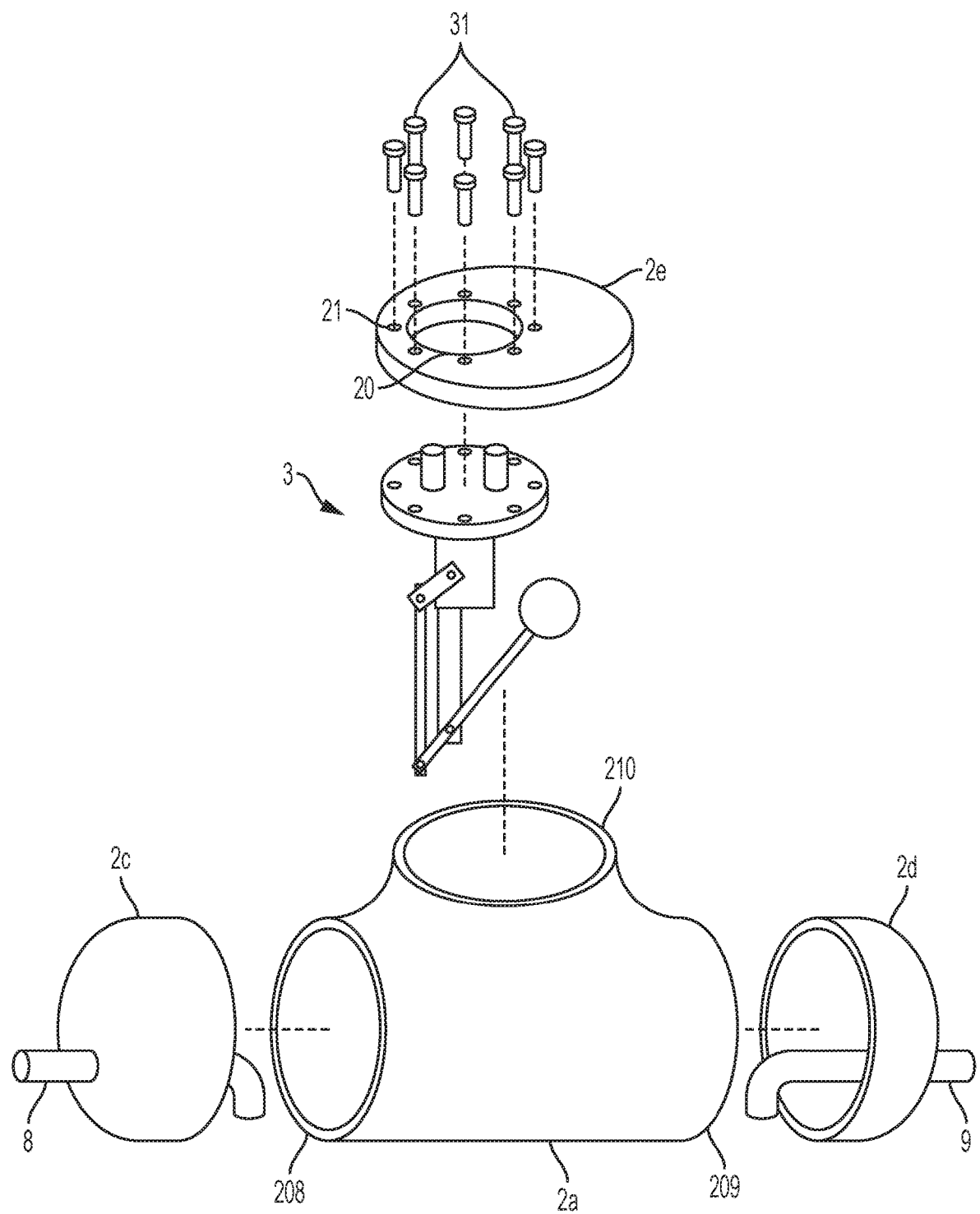
FIG. 3 is an exploded view of a pressure vessel according to an embodiment of the present disclosure.

The pressure vessel 2 comprises main body 2a which is a substantially cylindrical body with a major axis thereof oriented horizontally. Therefore, an aspect ratio, which is the ratio of the length to the height of an object, of the main body 2a when viewed from a side, as shown in the cutaway view of FIG. 2A, is larger than 1. In other words, a length of the main body 2a from a liquid inlet opening end 208 to a liquid outlet opening end 209 is larger than a length from the bottom of the main body 2a to a gas inlet opening end 210, as shown in FIG. 3. The length from the liquid inlet opening end 208 to the liquid outlet opening end 209 may be measured along the major axis of the substantially cylindrical shape of the main body 2a. The aspect ratio may be 5:4, for example. In other embodiments, the aspect ratio may lie in a range from 1:1 to 3:2, for example. A high length-to-height ratio is advantageous for accommodating a large volume of liquid while allowing the pressure vessel 2 to be stored underneath other equipment and low to the ground. The pressure vessel 2 may be used in a heat exchanger system, for example, and components of a heat exchanger system may already be positioned low to the ground. Therefore, a pressure vessel 2 is advantageously positioned below a heat exchanger, nearly flush with the floor, and the float-operated actuating mechanism contained in the pressure vessel 2 may have a trip point which is, for example, 8 inches from the ground.

Alternatively, the main body 2a of the pressure vessel 2 may be constructed according to any arbitrary aspect ratio, so long as sufficient range of motion is provided for the float linkage of the actuating mechanism 3 to swing through in the interior of the chamber.

Figure 10:
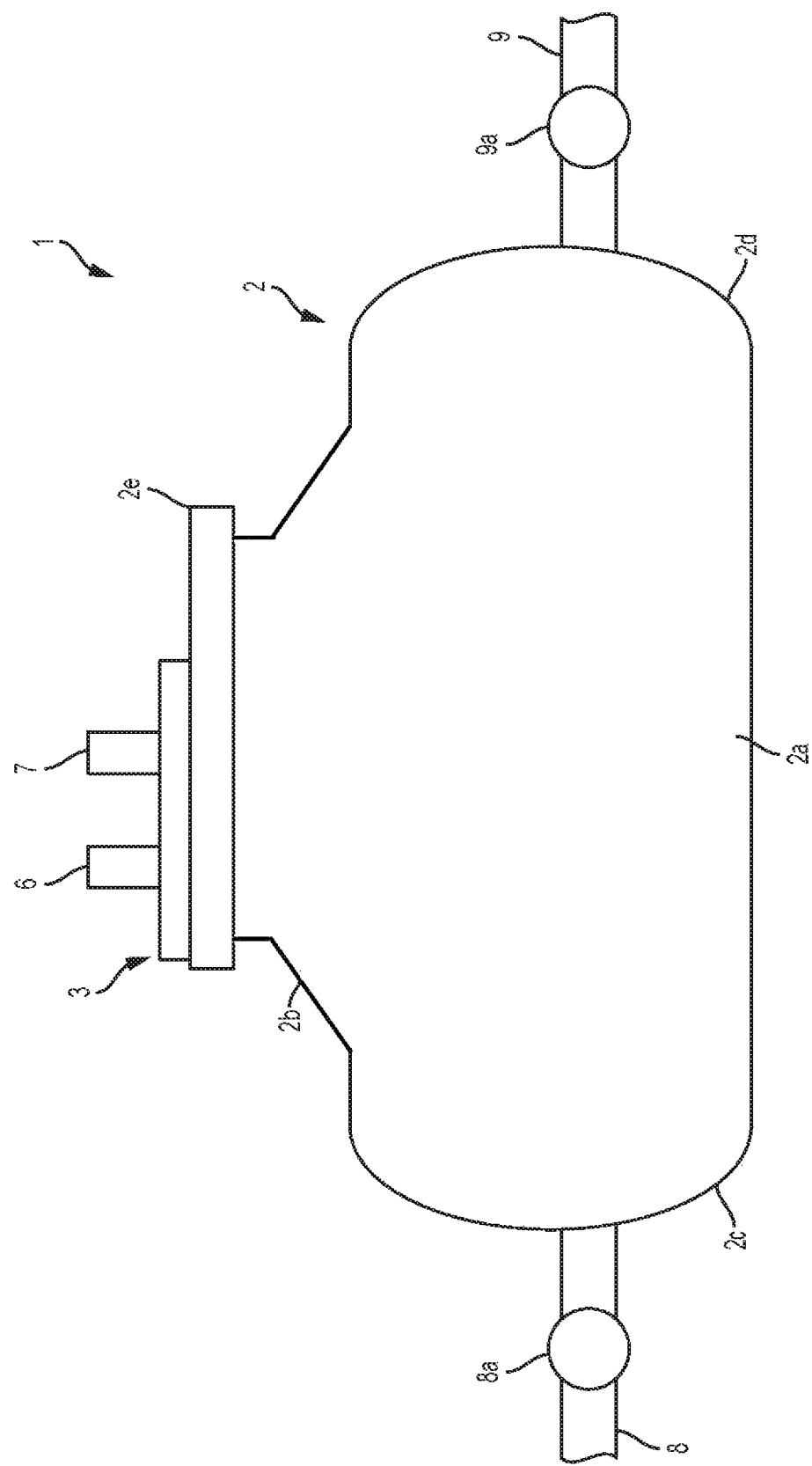
FIG. 10 is an isometric view of a pressure vessel according to an embodiment of the disclosure.

The flared out portion 2b may be a trumpet shaped truncated cone section flaring out to form a smooth radiused connection with the main body 2a of the pressure vessel 2. The flared out portion 2b may be radiused around its entire circumference where it joins with the main body 2a. In an alternative embodiment, a flared out portion may be formed partially around the circumference of a hole formed in the main body 2a, such that the flared out portion is adjacent endcap 2c and adjacent endcap 2d, and thus the flared out portion accommodates the swinging action of the float on one side and the movement of the over-center toggle link mechanism 4 on the other side of the base 4c. Alternatively the flared out portion may be formed at only the one side of the base 4c to accommodate the float 5, or formed at only the other side of the base 4c to accommodate the over-center toggle link mechanism 4. Further still, as shown in FIG. 10, the flared out portion may be a straight truncated cone without a radius, such as a beveled edge.

Figure 5:
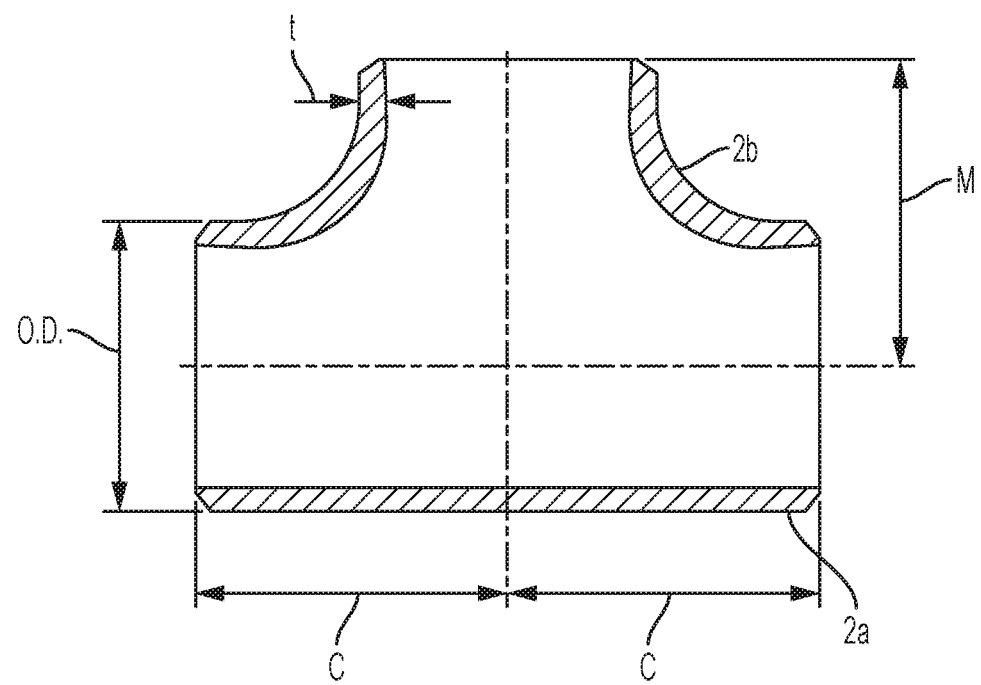
FIG. 5 is a cross-sectional view of a tee tube according to an embodiment of the present disclosure.

An example of a suitable structure for main body 2a and flared out portion 2b may be a tee-tube such as that defined by the American National Standards Institute (ANSI). For example, the tee-tube may be a B 16.9 straight tee-tube having parameters: nominal pipe size 12 inches (that is, outer diameter=12 inches), wall thickness schedule 0.180 inches, C=10 inches, and M=10 inches, where C and M are a center-to-end dimension of straight and side branches, respectively, as shown in FIG. 5. The tee-tube has two straight branches and one side branch which joins the main body of the tee-tube at a 90 degree angle.

When a tee-tube is used for the pressure vessel 2, a result is that main body 2a and flared out portion 2b may be integral. For example, an ANSI tee-tube is conventionally formed by forging or casting to obtain a single piece of material. An advantage of using a forged or cast tee-tube is that significantly less welding is required to construct a sealed pressure vessel compared to an instance in which two sections of straight tubing are joined. In the instance where two straight sections are joined to create a tee-like structure, a hole would be cut in one of the straight sections and the other section would be welded to the hole, forming a sharp 90 degree corner. However, as discussed above, a sharp corner is not desirable from the standpoint of allowing maximum float ball travel in the chamber interior. Furthermore, sealing the container is essential for forming a pressure vessel, but providing a satisfactory seal by welding is laborious and expensive. Therefore, from a manufacturing standpoint it is desirable to reduce the amount of required welding.

Next, exemplary embodiments related to manufacturing and assembly shall be discussed.

Figure 4:
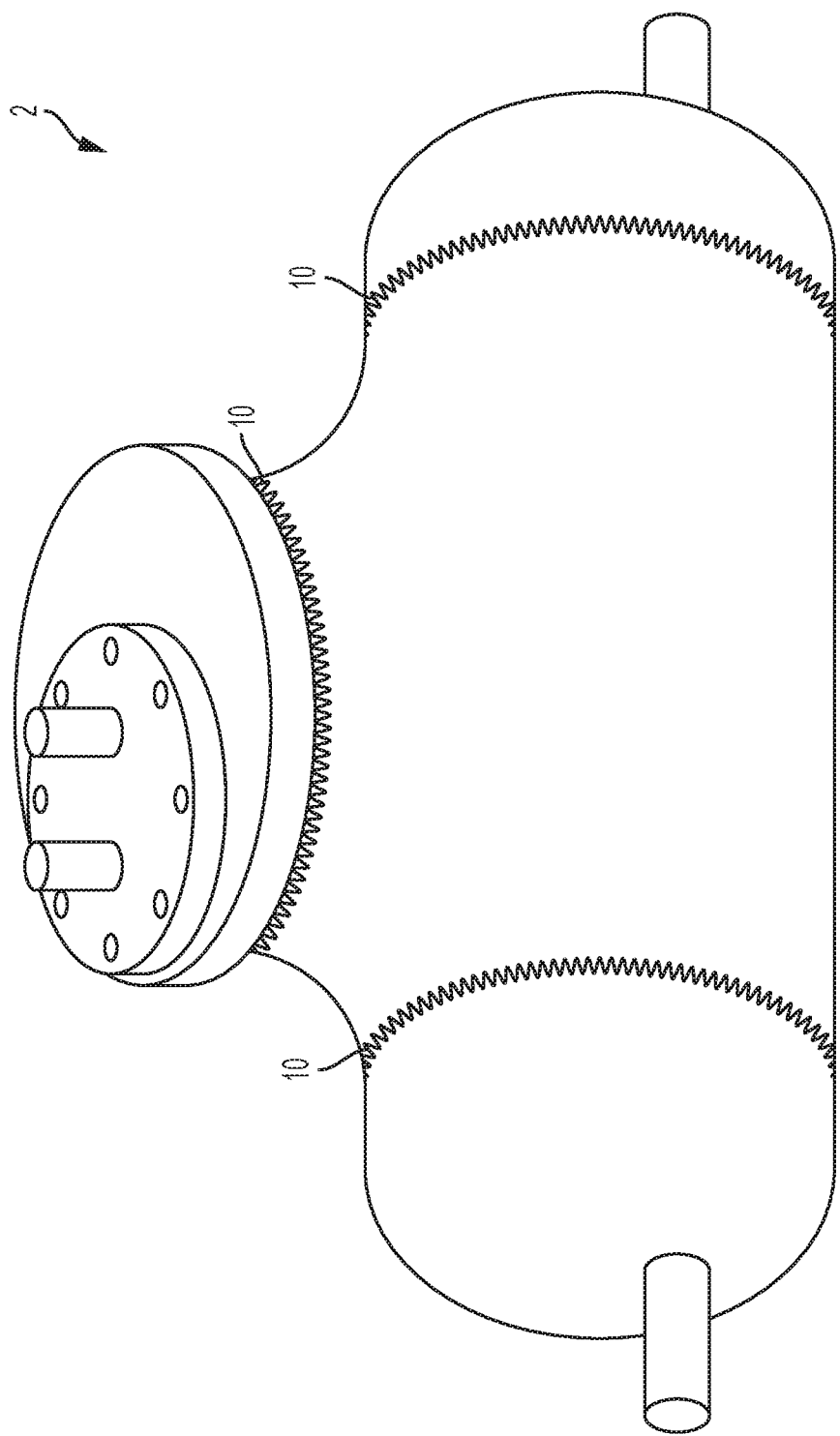
FIG. 4 is an isometric view of a pressure vessel according to an embodiment of the present disclosure.

In an exemplary embodiment, the pressure vessel 2 may be assembled as follows with reference to FIG. 3. First, a tee-tube is provided constituting both the main body 2a and flared out portion 2b. Next, two cap sections which are modified to comprise an opening for allowing the attaching of inlet/outlet tubing are provided to form endcap 2c and endcap 2d. Next, a flat circular plate being 1 and ¼ inches thick, which comprises an offset hole 20 being 6 inches in diameter, is prepared as the cover 2e. The actuating mechanism 3 is joined to the cover 2e by fitting through the offset hole and bolting the actuating mechanism 3 to the cover 2e. The entire structure is sealed by welding endcap 2c, endcap 2d, and cover 2e to the tee tube thereby forming weld seams 10. The assembled pressure vessel 2 is shown in FIG. 4. The material of the pressure vessel 2 may be a metal, such as carbon steel or stainless steel.

The hole 20 may be offset, as described above, or may be positioned at another location on the cover 2e. The cover 2e is configured to mount the actuating mechanism 3. For example, there is provided a plurality of fasteners 31 configured to mate with holes 30 in the actuating mechanism 3 and holes 21 in the cover 2e. The fasteners 31 fasten the actuating mechanism 3 to the cover 2e. The fasteners 30 may comprise bolts and nuts. A gasket may be provided to enhance sealing.

The gas inlet valve 6 may be a threaded ½ inch hole, and the vent valve 7 may be a 1 inch threaded hole, such that appropriate connections can be made. For example, in the above exemplary embodiment, the high pressure gas supplied into the gas inlet valve 6 may be steam introduced at a pressure of 100 psi or higher. The liquid L accumulated in the pressure vessel 2 may be water. In an exemplary embodiment using the dimensions and conditions specified in the exemplary description above, 7-8 gallons of water stored in the pressure vessel 2 can be ejected within a 9 second discharge cycle of the pump.

Figure 6:
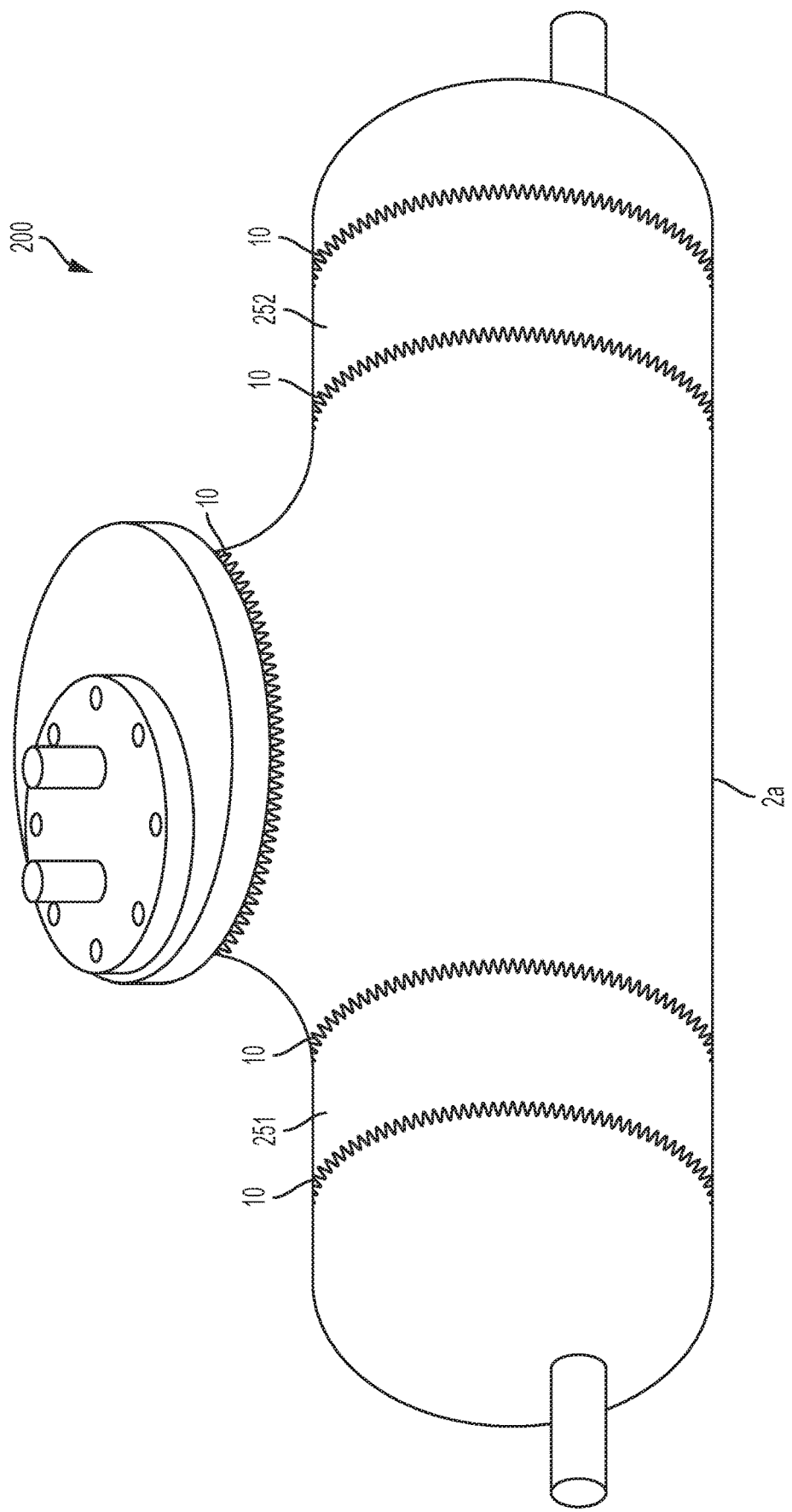
FIG. 6 is an isometric view of a pressure vessel according to an embodiment of the present disclosure.

A modified embodiment is shown in FIG. 6, in which straight pipe segments or spool pieces are interposed between the tube main body and end caps. In a pressure vessel 200 of the modified embodiment, one or more spool pieces may be installed to increase the liquid holding capacity of the pressure vessel. For example, as shown in FIG. 6, spool piece 251 is installed at the liquid inlet opening end and spool piece 252 is installed at the liquid outlet end. The spool pieces are joined to the main body 2a by welding thus forming weld seams 10. By providing spool pieces which protrude axially from the main body 2a in the longitudinal direction, the internal volume of the pressure vessel is increased without adding to the overall height of the pressure vessel. Additionally, spool pieces can be provided on only one or the other of the liquid inlet/outlet ends to fit specific packaging constraints, if necessary.

Advantages of using a standard tee-tube to form a pressure vessel 2 include standardization of parts, since ANSI tubing components are recognized to be universal. Furthermore, such a pressure vessel is symmetric with respect to both a transverse and sagittal plane and thus highly balanced. Additionally, as noted above, the actuating mechanism 3 can be conveniently disposed in the side branch of the tee-tube where a flared out portion 2b accommodates the range of motion of both the float 5 and over-center toggle linkage components of the actuating mechanism 3.

An additional benefit of the design of exemplary embodiments of the present disclosure is that endcaps can be modified so that the openings for allowing the attaching of inlet/outlet tubing can be moved up or down to ensure a given level of liquid is maintained. Furthermore, the inlet/outlet tubing can be adjusted in the axial direction (left and right in FIG. 3) to give adequate distance in installing inlet check valve 8a and outlet check valve 9a.

Figure 9:
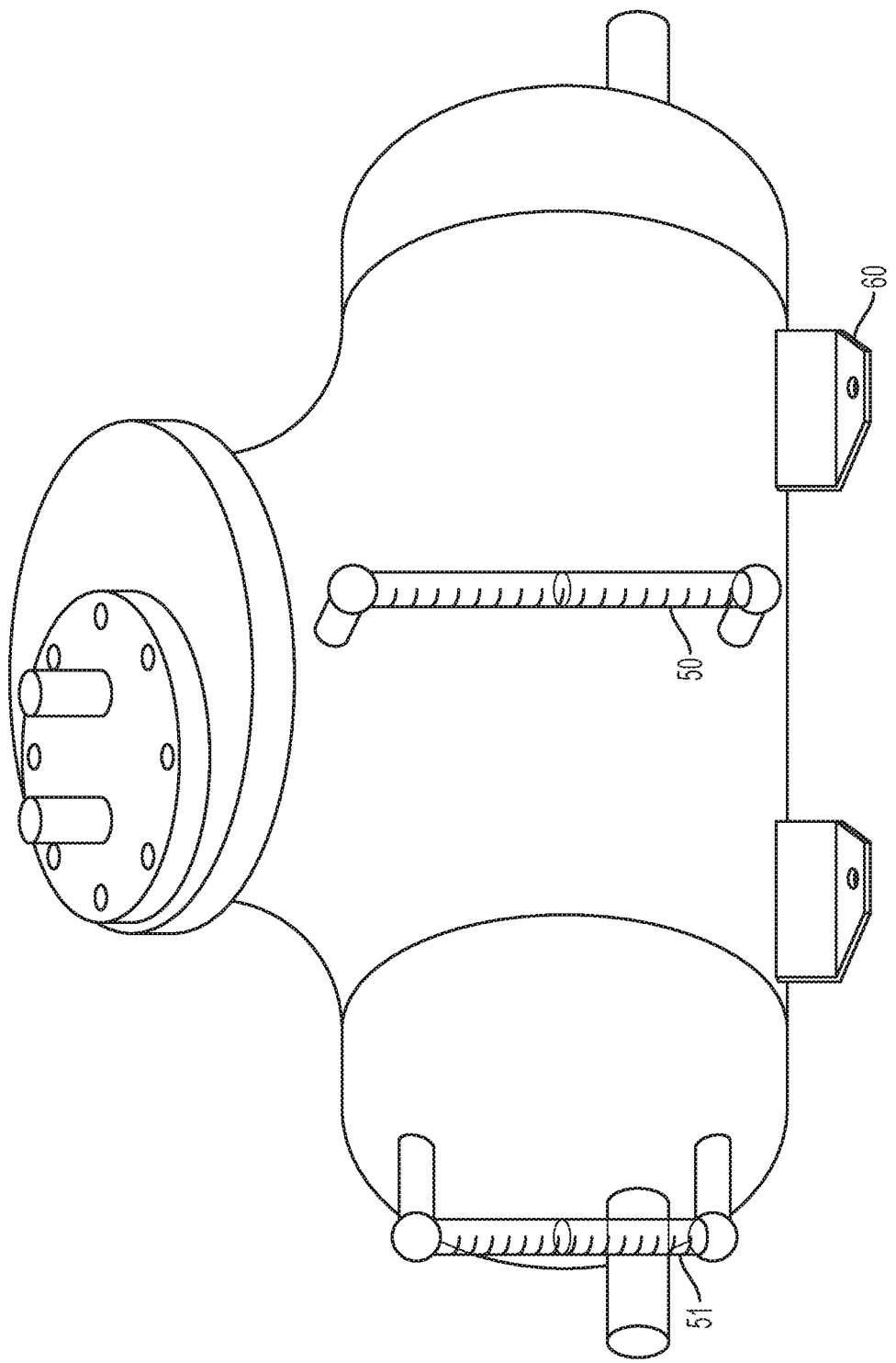
FIG. 9 is an isometric view of a pressure vessel according to an embodiment of the present disclosure.

It should be noted that the above described exemplary embodiments may be modified without materially departing from the novel teachings and advantages of the exemplary embodiments. For example, one or more sight glasses may be attached at various positions to the pressure vessel such that the liquid level contained within can be easily ascertained. FIG. 9 shows a pressure vessel having a sight glass 50 installed on a tube main body and a sight glass 51 installed on an tube end cap. FIG. 9 also shows feet 60 which may be used to secure the pressure vessel to the ground or to a fixture with fasteners.

As previously mentioned, rather than directly attaching cap sections to the straight branches of the tee-tube, it is possible to increase the volume of the pressure vessel 2 by interposing additional tubing between the tee-tube and cap sections or cover plate. Alternatively, if a smaller volume is desired, flat plates can be substituted for round endcaps on one or both of the straight branches. Further, one or more of the branches of the tee-tube can be cut to be shorter before attaching cap section or the cover plate.

Furthermore, the dimensions and measurements given above with reference to the described embodiments are exemplary and it should be understood that the dimensions can be modified accordingly.

Additionally, although one type of actuating mechanism 3 is shown as detailed in FIGS. 7 and 8, a different type of actuating mechanism could be used in the pressure vessel 2. For example, an actuating mechanism incorporating a force amplification system may be employed.

The foregoing description of exemplary embodiments is intended to be illustrative. Many alternatives, modifications, and variations will be apparent to those skilled in the art. Descriptions and features listed in relation to the foregoing exemplary embodiments are not to be construed as limiting the present inventive concept, the scope of which is defined by the following claims.

What is claimed is:

1. A pressure vessel apparatus comprising:
a branched tube comprising a substantially cylindrical tube main body and a side branch, wherein the side branch comprises a flared out portion orthogonally connected to the substantially cylindrical tube main body;
a liquid inlet opening disposed at a first end of the branched tube;
a liquid outlet opening disposed at a second end of the branched tube;
a gas inlet opening disposed at the side branch of the branched tube; and
a cover plate mounting a valve actuating mechanism in the branched tube, the cover plate being joined to the branched tube at the side branch,
wherein the valve actuating mechanism comprises a float and a float arm housed within the substantially cylindrical tube main body,
the float being positioned at an off-center position closer to one of the first end or the second end than to another of the first end or the second end,
wherein at a lowest position of the float, the float is located entirely within the substantially cylindrical tube main body, and
wherein at an upper triggering position of the float, at least a portion of the float is located within the side branch and positioned at least partially above a top of the substantially cylindrical tube main body.

2. The pressure vessel apparatus of claim 1, wherein the cover plate is welded to the branched tube at the side branch.

3. The pressure vessel apparatus of claim 1, wherein the flared out portion and the substantially cylindrical tube main body are integral.

4. The pressure vessel apparatus of claim 1, wherein the flared out portion comprises a straight truncated cone section flaring out to form a tapered connection with the substantially cylindrical tube main body.

5. The pressure vessel apparatus of claim 1, wherein the cover plate comprises an offset hole, wherein the valve actuating mechanism is configured to be inserted through the offset hole.

6. The pressure vessel apparatus of claim 1, wherein the branched tube is an ANSI tee-tube.

7. The pressure vessel apparatus of claim 1, wherein a length from the liquid inlet opening to the liquid outlet opening along a longitudinal axis of the substantially cylindrical tube main body is larger than a length from the bottom of the substantially cylindrical tube main body to the gas inlet opening in a direction perpendicular to the longitudinal axis of the substantially cylindrical tube main body.

8. The pressure vessel apparatus of claim 1, wherein the float arm is connected to the float, and
wherein the float is configured to pivot about an axis provided at a position on the float arm away from the float.

9. The pressure vessel apparatus of claim 1, wherein the pressure vessel apparatus comprises carbon steel.

10. The pressure vessel apparatus of claim 1, wherein the flared out portion comprises a trumpet shaped truncated cone section flaring out to form a smooth radiused connection with the substantially cylindrical tube main body.

11. The pressure vessel apparatus of claim 10, wherein the flared out portion is radiused around an entire circumference where the flared out portion joins with the substantially cylindrical tube main body.

12. The pressure vessel apparatus of claim 1, further comprising
a first cap section connected to the first end; and
a second cap section connected to the second end.

13. The pressure vessel apparatus of claim 12, wherein
the first cap section comprises the liquid inlet opening, and
the second cap section comprises the liquid outlet opening.

14. The pressure vessel apparatus of claim 12, wherein the first cap section is welded to the branched tube at the first end, and the second cap section is welded to the branched tube at the second end.

15. The pressure vessel apparatus of claim 12, further comprising at least one tube segment configured to be interposed between the branched tube and one of the first cap section and the second cap section.

16. A pressure vessel apparatus comprising:
a branched tube comprising a substantially cylindrical tube main body and a side branch, wherein the side branch comprises a flared out portion orthogonally connected to the substantially cylindrical tube main body;
a liquid inlet opening disposed at a first end of the branched tube;
a liquid outlet opening disposed at a second end of the branched tube;
a gas inlet opening disposed at the side branch of the branched tube;
a valve actuating mechanism, wherein the valve actuating mechanism comprises a float and a float arm housed within the substantially cylindrical tube main body, the float being positioned at an off-center position closer to one of the first end or the second end than to another of the first branch or the second end; and a cover plate configured to mount the valve actuating mechanism in the branched tube, the cover plate being joined to the branched tube at the side branch, wherein the flared out portion comprises a trumpet shaped truncated cone section flaring out to form a smooth radiused connection with the substantially cylindrical tube main body, wherein at a lowest position of the float, the float is located entirely within the substantially cylindrical tube main body, and wherein at an upper triggering position of the float, at least a portion of the float is located within the side branch and positioned at least partially above a top of the substantially cylindrical tube main body.

17. The pressure vessel apparatus of claim 16, wherein the float arm is connected to the float, and wherein the float is configured to pivot about an axis provided at a position on the float arm away from the float.

18. The pressure vessel apparatus of claim 16, wherein the pressure vessel apparatus comprises carbon steel.

\* \* \* \* \*